United States Patent

[11] 3,609,486

| [72] | Inventors | Heinrich Feldhoff<br>Bad Duerkheim;<br>Georg Schlereth, Limburgerhof/Upper<br>Palatinate, both of Germany; Badische<br>Anilin- & Soda-Fabrik Aktiengesellschaft,<br>Ludwigshafen/Rhine, Land<br>Rhineland/Upper Palatinate, Germany |
|------|-----------|---|
| [21] | Appl. No. | 865,940 |
| [22] | Filed | Oct. 13, 1969 |
| [45] | Patented | Sept. 28, 1971 |
| [32] | Priority | July 22, 1965 |
| [33] | | Germany |
| [31] | | P 14 38 974.3 |

[54] METHOD AND APPARATUS FOR MOVEMENT OF MECHANICAL MEMBERS BY AN ELECTRIC MOTOR
6 Claims, 4 Drawing Figs.

[52] U.S. Cl. .................................................. 318/138,
318/599, 318/646, 318/430, 318/434
[51] Int. Cl. ....................................................... G05b 11/28

[50] Field of Search........................................... 318/138,
341, 227, 231, 345, 32, 599, 606, 430, 431, 436,
646, 434

[56] References Cited
UNITED STATES PATENTS

| 3,249,839 | 5/1966 | Fay.............................. | 318/345 X |
| 3,260,912 | 7/1966 | Gregory ....................... | 318/345 X |
| 3,307,094 | 2/1967 | Ogle............................. | 318/345 X |
| 3,309,592 | 3/1967 | Favre ........................... | 318/345 X |
| 3,373,378 | 3/1968 | Cottrell........................ | 318/138 X |
| 3,443,188 | 5/1969 | Mortimer..................... | 318/341 X |
| 3,452,263 | 6/1969 | Newell ......................... | 318/138 |
| 3,487,458 | 12/1969 | Martins ........................ | 318/606 |

Primary Examiner—G. R. Simmons
Attorney—Johnston, Root, O'Keeffe, Keil, Thompson & Shurtleff ABSTRACT: Method and apparatus for control of DC motor directly connected to actuating element of control or regulating device with step actuation of motor by pulse modulation in trains of individual pulses whose energy content is varied in dependence on the force requirement to move the mechanical member.

PATENTED SEP 28 1971 3,609,486

INVENTORS:
HEINRICH FELDHOFF
GEORG SCHLERETH

BY: *Johnston, Root, O'Keeffe, Keil, Thompson & Shurtleff*
ATT'YS

# 3,609,486

METHOD AND APPARATUS FOR MOVEMENT OF MECHANICAL MEMBERS BY AN ELECTRIC MOTOR

RELATED APPLICATION

This application is a continuation-in-part of our application Ser. No. 566,884, filed July 21, 1966.

The invention relates to a method for the stepwise movement of a mechanical member by means of an electric motor and relates in particular to the control of a DC motor having a particularly low moment of inertia which is directly connected with the actuating elements of control valves, gate valves, butterfly valves and similar shutting-off devices or regulating means. In the case of control and gate valves, the DC motor is mounted on the yoke and directly coupled to the operating stem. The method according to the invention permits movement of a mechanical member by means of an electric motor by varying the energy content of the switching steps of the mechanical member in dependence on the thrust requirement of the mechanical member, for example the operating stem of a valve, whilst permitting a high actuating velocity and switching steps of constant width.

Control loops in process engineering are almost invariably influenced directly at the point of actuation by mechanical control elements. In chemical plant, control valves, butterfly valves and gate valves are the most commonly used control elements for varying process data. It is known that pneumatic, electrical and hydraulic actuators may be used for operating such control elements. Pneumatic diaphragm actuators are commonly used, because of their simple construction and their capability of providing relatively high thrust forces at high speeds of response and with accurate positioning. Electric-motor actuation has hitherto required longer actuating times for the same thrust forces. In process control, pneumatic units have therefore usually been used as controllers for control valves, butterfly valves, gate valves and similar final control elements. Electronic controllers are however superior to pneumatic controllers, particularly with regard to the speed of response. Another advantage of an electronic controller, particularly when embodying a magnetic amplifier or a semiconductor circuit, is to be seen in its long life and relatively maintenance-free operation. Finally, electronic controllers may be operated in conjunction with process-control computers more easily than pneumatic controllers.

If, in prior art methods, a diaphragm actuator is controlled by an electronic controller, an electropneumatic positioner or transducer is required as an intermediate unit. Nevertheless a pneumatic actuator has in most cases proved to be more economical and/or more favorable from a control engineering point of view than an electric or electrohydraulic actuator, mainly because of its high speed of response. In the prior art electric actuators, inertia of the mass to be moved (e.g., in rotors and gearing) causes a reduction in the speed of response. It has therefore not hitherto been possible to fully utilize the above-mentioned advantages of electronic controllers in connection with electric actuators.

Attempts have already been made to provide an electric actuator which works more rapidly. One type of electromagnetic actuator is known which is, so to speak, the electrical analogue to the diaphragm actuator. Its current-dependent force is converted by the opposing force of a spring into a proportional positioning movement. Since the power loss of such an actuator is dependent on the square of the current, only relatively small thrusts can be produced which are inadequate for many uses. Another more rapid electric actuator makes use of a continually running motor which can be coupled to the driving shaft of the control element by means of a magnetic clutch for right or left hand rotation through a reversing gear. Although this drive permits higher thrust forces than the above-mentioned electromagnetic drive, it does not generate the forces available with the larger diaphragm actuators.

The prior art also comprises electrohydraulic actuators which are to be regarded as about equal to pneumatic actuators as regards speed of response and thrust forces. However, their complex design prevents them from being widely used.

Finally methods are known which make possible a certain increase in the speed of response by special control of the stepping operation of the electric motor. It is common to all these methods that a large positioning movement is executed not in one step but by a number of successive switching steps. The smallest possible switching step determines the accuracy of positioning. Since the pause after each switching step increases the total positioning time, it is not expedient to use switching steps and pauses which are of constant duration.

Pulse width modulation and pulse frequency modulation are known from communication engineering. Both types of modulation make possible an increasing speed of response in the case of an increase in the control error, i.e., the deviation of the actual value of the controlled variable from the set point. From the point of view of control engineering, however, the so-called pulse ratio modulation is often more favorable. A more descriptive term for pulse ratio modulation is pulse width-pulse frequency modulation.

DESCRIPTION OF THE INVENTION

FIG. 1 shows the dependence of the pulse frequency A and the pulse duration B on the control signal C in pulse ratio modulation. According to this, in the case of a small control signal, the actuator moves with small steps of low frequency, i.e., slowly. As the control signal C increases, the pulse frequency A rises rapidly to a maximum and then decreases again. The pulse duration B follows an exponential function. With an increasing control signal, the actuator thus very soon reaches its maximum speed.

If a motor having a particularly low moment of inertia, for example, a disc armature motor, is used as the actuator, a speed of response may be achieved which exceeds that of a pneumatic actuator. Moreover, with the additional use of pulse ratio modulation, actuators may be obtained which in combination with electronic controllers show advantageous properties not hitherto attainable and constitute an advance in control engineering (see British Pat. Specification No. 1,108,049).

To provide a rapid and high-performance actuator, however, the following factors have to be taken into consideration. Mechanical control elements require, for operation, a force which varies considerably over the control range concerned. Thus for example in the case of single seat valves, the force on the valve spindle produced by the pressure drop in the medium falls off strongly from a maximum near the closed position as the opening increases. An electric actuator, however, converts the energy of a pulse of the motor into the work done in the switching step (i.e., the product of force and distance). With a constant energy of the pulse, therefore, the magnitude of the step, and consequently the accuracy of positioning, varies in dependence on the load. If the energy of the minimum switching step resulting from the pulse modulation is so dimensioned that at the maximum load it gives the required accuracy of positioning, then the steps become larger as the load decreases. The desired accuracy of positioning cannot then be maintained. If, conversely, the energy of the smallest switching step be adapted to the minimum load, then as the load increases the steps become smaller. Although the accuracy of regulation increases, the speed of response decreases. It is therefore not possible merely by using the known pulse ratio modulation to achieve the maximum speed of response with a low-inertia motor.

The invention therefore has for its object to control by solid-state circuit switching the energy of the individual pulses produced according to a pulse modulation, preferably pulse ratio modulation, so that a constant accuracy of positioning and reproducible speed of response are achieved independently of the force requirement of the control element.

This object is achieved by forming the switching steps by pulse trains consisting of individual pulses which follow each other practically without a pause and whose energy content is varied in dependence on the force requirement of the mechanical member to be moved. Pulses having the duration of the smallest pulse resulting from the pulse modulation used are arranged in series to form pulse trains practically without intermediate pauses, in order to produce the longer pulses required by the pulse modulation when the control error increases.

According to the invention the individual pulses of the pulse train are given the desired energy content by turning on the power pulses at phase positions determined by the force requirement of the mechanical member. The number of individual pulses in a train, the lull periods between the trains, and the frequency with which the pulse trains appear is determined according to the type of pulse modulation used. Finally, the breaking up of the stroke of the final control element into switching steps having a constant width, also makes possible purely electrical digital control with a process-control computer.

DESCRIPTION OF THE DRAWINGS

A preferred embodiment of the invention is illustrated in the drawings, wherein.

DESCRIPTION OF THE PREFERRED EMBODIMENT

Figure 1:
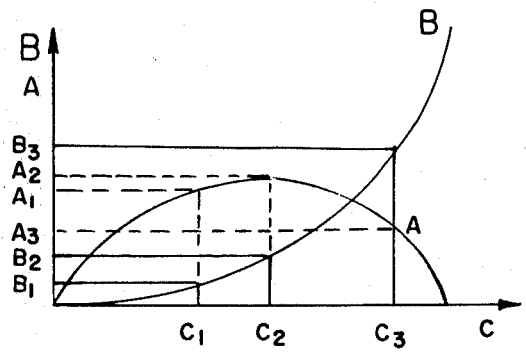
FIG. 1 shows pulse frequency and pulse duration as a function of control error.
Figure 4:
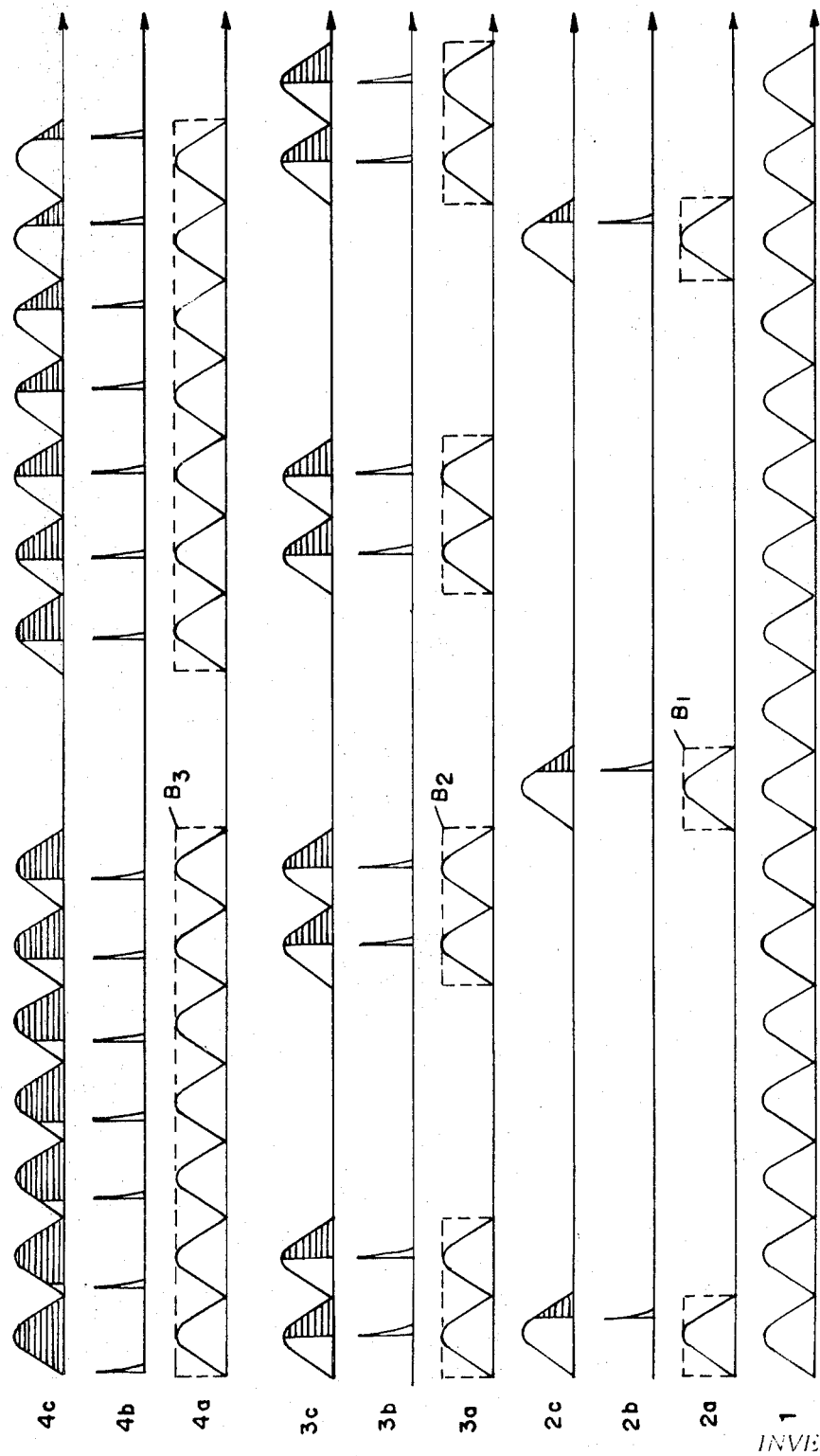
FIG. 4 is a series of plots showing pulse trains and their interdependence in the control system.

Referring to FIGS. 1 and 4, control signals, i.e., amplified control error or deviation, of magnitudes $C_1$, $C_2$ and $C_3$ cause corresponding pulse durations $B_1$, $B_2$ and $B_3$ which are repeated with pulse frequencies $A_1$, $A_2$ and $A_3$. For the case of power obtained from the AC mains, FIG. 4 shows the interdependence of pulse durations $B_1$, $B_2$ and $B_3$, their corresponding pulse trains and power pulses of the desired energy content turned on by firing pulses at phase positions determined by the force requirement of the mechanical member. Line 1 shows basically how with full wave rectification half cycles of the AC mains are arranged in series and practically without intermediate pause to form a long pulse train. The invention, however, is not restricted to pulse trains obtained by full wave rectification. The requirements of the individual application will determine if the economy resulting from less components needed when employing half wave rectification is worth the corresponding reduction in maximum speed of actuation. Lines $2a$, $3a$ and $4a$ show dashed the pulse durations $B_1$, $B_2$ and $B_3$ caused by control signals $C_1$, $C_2$ and $C_3$. In line $2a$ the pulse duration (pulse width) $B_1$ is chosen to represent the smallest pulse duration allowed and to correspond to one full half cycle of the AC mains used. This pulse is repeated with pulse frequency $A_1$, i.e., 3 times within the time taken as the basis of FIG. 4. Similarly line $3a$ shows pulse duration $B_2$ formed by two half cycles repeated with pulse frequency $A_2$, i.e., increased pulse frequency. Line $4a$ shows particularly the effect of pulse ratio modulation with a large control signal, i.e., a considerably increased pulse duration $B_3$ repeated with a reduced pulse frequency $A_3$. Thus the pulse duration $B_3$ is represented by a pulse train consisting of seven half cycle pulses. Lines $2b$, $3b$ and $4b$ show the firing pulses at phase positions determined by the assumed force requirement of the mechanical member turning on the power pulses energizing the actuating motor which are shown, respectively, at lines $2c$, $3c$ and $4c$. As can be seen the power pulses have energy contents proportional to their shaded areas in dependence on the firing pulses shifted in phase with respect to the basic pulse trains. Thus line $2c$ shows power pulses of small energy resulting from the basic pulse duration $B_1$ and pulse frequency $A_1$ and line $3c$ shows power pulses of medium energy based on pulse trains of duration $B_2$ and pulse frequency $A_2$. In line $4c$ it is assumed that the force requirement of the mechanical member diminishes as it is moved stepwise. According to the invention the energy of each pulse in the pulse trains is consequently reduced. As this reduction in energy is made proportional to the force requirement of the mechanical member it is actuated with steps of constant width, the number of switching steps which are executed with powerline frequency being determined by the pulse duration, i.e., number of pulses in each train. This example was chosen for ease of presentation and may be considered indicative of processes with small time constants such as is the case with many pressure control loops. Assuming a fairly typical application of 200 steps for a total stroke of the valve stem and full wave rectification of a 50 c.p.s. power supply, then a full stroke movement caused by control signals $C_1$, $C_2$ and $C_3$ would be executed in 14, 5 and 2.56 seconds, respectively.

Calculation of time required for full stroke movement:

$C_1$, 1 power pulse in 7 full wave rectification pulses, $$\frac{200 \text{ pulses}}{2\times 50 \text{ pulses/sec}} \times \frac{7}{1} = 14 \text{ sec.}$$

$C_2$, 2 power pulses in 5 full wave rectification pulses, $$\frac{200}{2\times 50} \times \frac{5}{2} = 5 \text{ sec.}$$

$C_3$, 7 power pulses in 9 full wave rectification pulses, $$\frac{200}{2\times 50} \times \frac{9}{7} = 2.56 \text{ sec.}$$

Another feature of the invention is that a force-measuring means is provided on the mechanical member, the force-measuring means being employed to vary the way in which the energy content of the pulses is controlled.

Further features of the invention will be evident from the following description and the relevant drawings which show various block circuit diagrams for AC mains operation and as applied by way of example, to the actuation of a process control valve.

Figure 2:
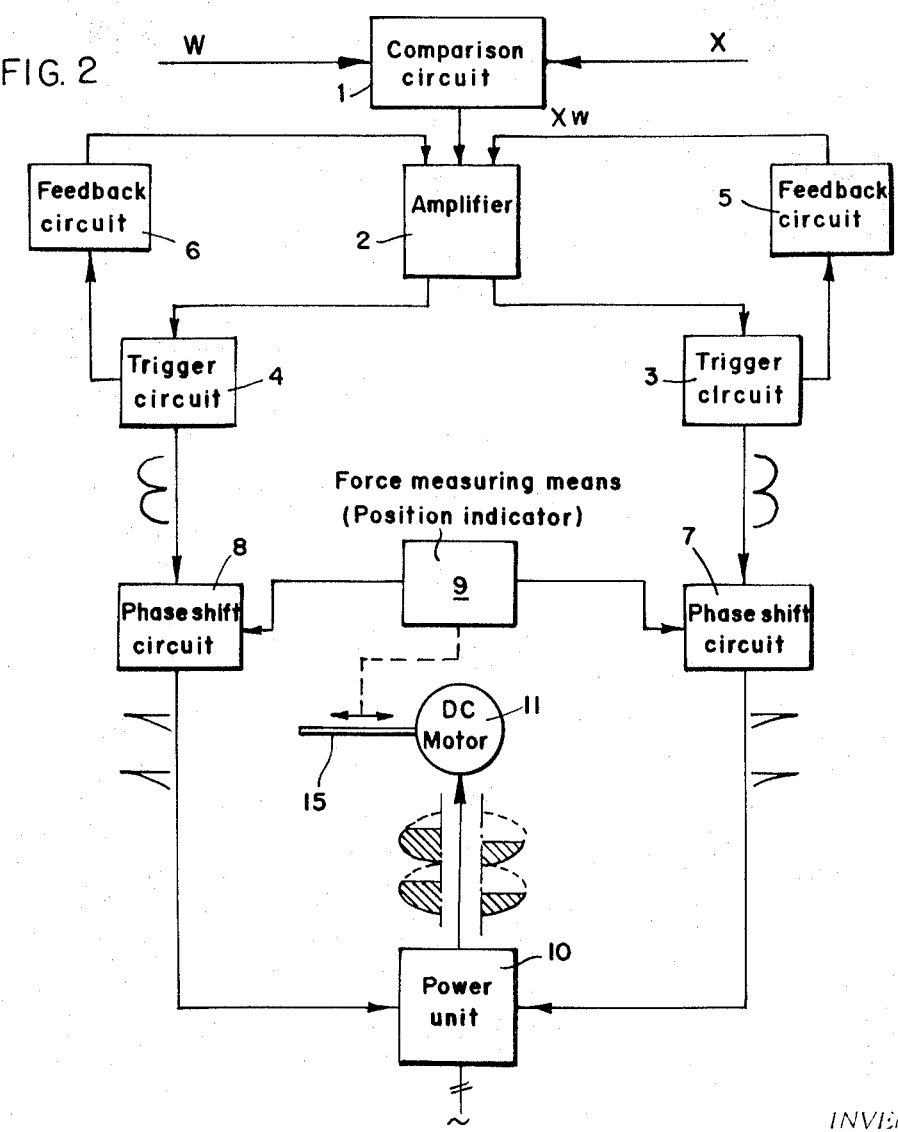
FIG. 2 shows a block diagram of the control system.

FIG. 2 shows an arrangement for stepwise motorized actuation of a single seat valve, the power being supplied from the AC mains. As is conventional for electronic controllers, the deviation Xw is determined in a comparison circuit 1 as the difference between the actual value of the controlled variable X and the set point W. This deviation Xw is amplified by the amplifier 2 and supplied to one or the other of two trigger circuits 3 or 4 according to its sign. The sign of the deviation Xw depends on whether the actual value X is greater or less than the set point W. As long as the actual value equals the set point, the valve position is not changed. If a certain minimum deviation (called the threshold value) should occur, however, one or the other of the triggers 3 or 4 switches, depending on the sign. In contrast to the conventional design of electronic switching controllers where a direct current appears as the output of the trigger circuit in question, in a controller according to the invention, a series of half-wave pulses appear, which are preferably obtained by rectification of the alternating current of the mains, as indicated beside the output signal line of trigger circuits 3 and 4 and shown in FIG. 4 lines $2a$, $3a$, $4a$.

At the moment of the switching of trigger circuit 3 or 4, a signal is transmitted, via the appropriate feedback circuit 5 or 6 to the input of the amplifier 2 which produces the desired pulse modulation, preferably pulse ratio modulation, at the output of the trigger circuit 3 or 4 by virtue of the time response of the transmitted signal as a function of the magnitude of the deviation Xw. As is common practice in the design of electronic switching controllers the feedback circuits consist of a suitable combination of resistors and capacitors to cause a negative feedback signal which in interaction with the transfer characteristics of amplifier 2 and appropriate trigger 3 or 4 produces the desired type of pulse modulation. It should be noted, however, that due to the fast acting disc-armature motor used as actuator, which responds to single pulses having the duration of one half cycle of AC line power, the charging time constants of the feedback circuit must be typically one to two orders of magnitude smaller than is the case with switching controllers employing electromechanical output devices (relays) if such short pulse durations are to be achieved. Depending on the magnitude of the deviation Xw, the appropriate trigger circuit thus emits a variable number of half-waves in a pulse train. The number of half-waves corresponds to the pulse duration of the pulse modulation. The half-waves are synchronized in a phase shift circuit 7 or 8 with the half-waves of the power supply.

The force requirement is measured by a force-measuring means 9 arranged on the actuating member, i.e., in this case on the valve stem. In the case of valve stems, the preferred force-measuring means is a wire strain gauge or a magnetoelastic load cell, and for other actuating members piezoelectric transducers may be used. The electrical output of this force-measuring means is used to control the phase shift circuit 7 or 8 and therefore determines the time delay of firing pulse. The firing pulses, as indicated beside the output signal lines of triggers 3 and 4 and shown in lines 2b, 3b and 4b of FIG. 4 which are emitted by the phase shift circuits 7 or 8, are employed in a power unit 10 to close a normally open switch means, for which thyristors, also known as silicon controlled rectifiers in the art, are preferably used. Depending on the required direction of rotation, positive or negative half-waves, whose energy content is proportional to the integral of the current, as indicated beside the output line of power unit 10 and shown in lines 2c, 3c and 4c of FIG. 4, then pass to the disc armature motor 11. This disc armature motor directly drives the stem 15. A gear is not necessary between the motor and the stem. However, with actuating members other than valve stems, a gear may be interposed without destroying the desirable minimum moment of inertia and while retaining the essential features of the invention. By the phase shift of the firing pulses made in dependence on the electrical output of the force-measuring means 9, the energy content of each half-wave is made proportional to the force requirement concerned. The motor 11 thus turns with constant step widths and consequently with constant accuracy of positioning. If the delay angle of the phase shift circuit 7 or 8 is changed linearly by the output of the force-measuring means, the energy content of the half-waves driving the motor 11, which constitute a sine function between 0° and 180°, also has a sinusoidal shape. In the case of a single seat valve, the force requirement measured on the stem as a function of position, also has a shape similar to a sine function (see ISA Journal 9 (1962), page 41). Within the scope of the invention, it is therefore possible in the case of single seat valves to achieve a simplification in the arrangement by using, instead of the force-measuring means 9, the electrical output of a position indicator 9 dependent on stroke, to linearly vary the phase shift of the firing pulses with respect to the basic pulse trains. This position indicator 9, for example, a potentiometric or inductive position transducer, is, as a rule, desirable anyway for remote indication of the valve position. The additional expense of a force-measuring means arranged on the stem is then dispensed with.

Figure 3:
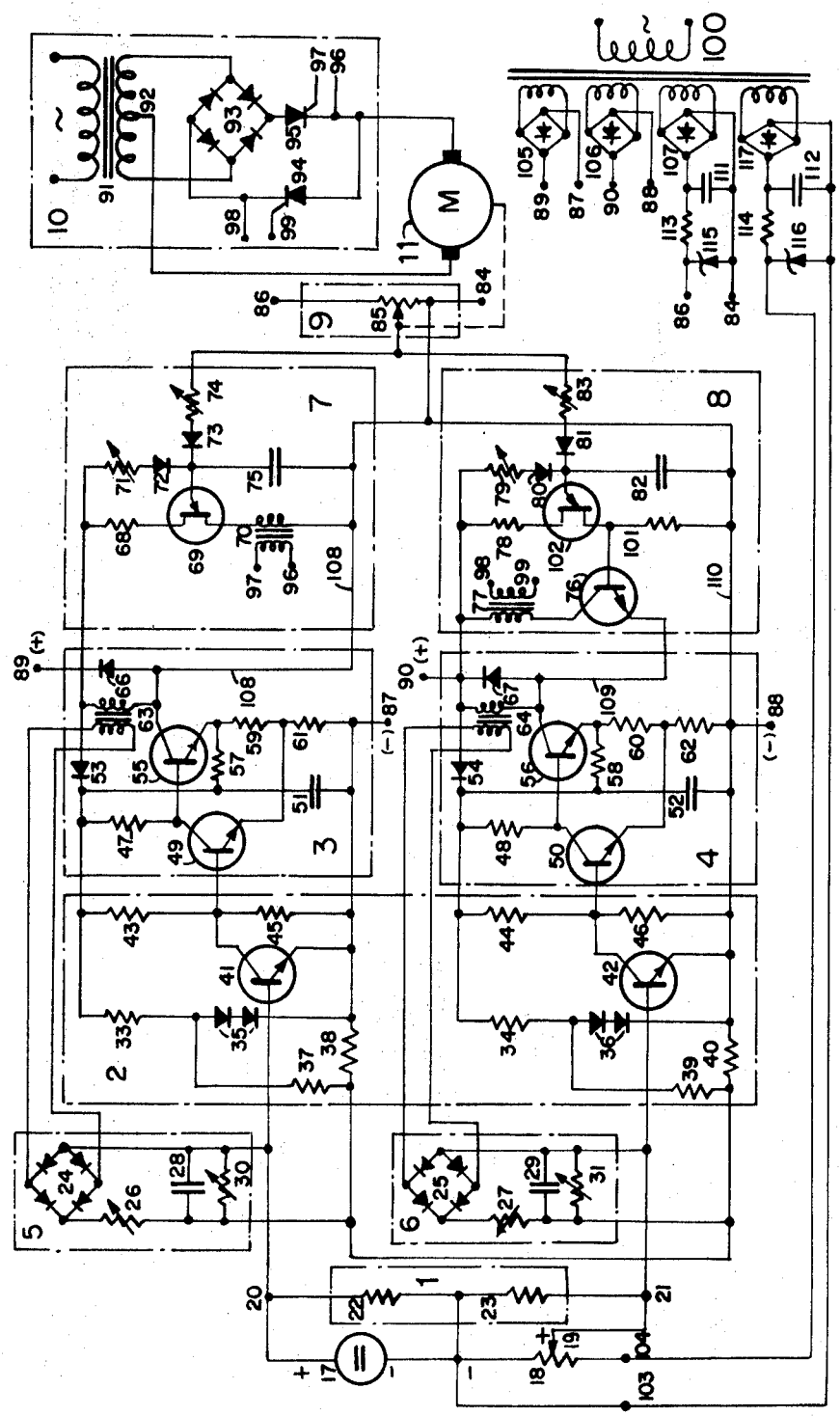
FIG. 3 is a schematic diagram showing the circuitry of FIG. 2.

Referring now to FIG. 3 a detailed schematic of possible embodiments of the control system according to FIG. 2 is shown. As will hereinafter become apparent from the following detailed description the individual circuits in each of the block circuits are not in and of themselves important with respect to the inventive features. To avoid undue complexity in the drawing some interconnections of various parts of the system are not drawn but indicated by identical numbers. For the same reason it is assumed the system is to actuate a single seat valve permitting to use the output of a potentiometric type of position transducer 9 to control the phase shift circuits 7 and 8. In contrast to the schematics of the other functional blocks assigned to forward and reverse rotation of the actuating motor 11 the details of phase shift circuits 7 and 8 are not shown identical but differing. As will be described later, phase shift circuit 8 has an important advantage for some applications at the expense of one additional resistor and transistor. Of course, in actual apparatus phase shifts circuits 7 and 8 would be made identical. The details of power unit 10 show one possible embodiment with full wave rectification.

The setpoint of the control system in FIG. 3 is represented by the voltage between slider 19 and terminal 103 of setpoint-potentiometer 18. This voltage is applied to resistor 23 of comparison circuit 1. The controlled variable is represented by the output of a suitable transmitter 17 and applied to resistor 22 of comparison circuit 1. These two voltage sources are connected back to back so that the positive terminal of the setpoint voltage is connected to terminal 21 and the positive terminal of the output of the transmitter 17 to terminal 20 of comparison circuit 1. In the null-condition both voltages are equal and there is consequently no output voltage between terminals 20 and 21 and no input to amplifier 2 and the following stages of the signal paths for each sense of actuation of motor 11 which in consequence is not switch on. Unfiltered full wave rectified current is supplied to terminals 89 (+) and 87 (−) of trigger circuit 3 and terminals 90 (+) and 88 (−) of trigger circuit 4 in order to facilitate synchronization of the firing pulses generated by the phase-shift circuits 7 and 8. The trigger circuits shown are modified versions of circuits known as Schmitt trigger in the art. The trigger circuits 3 and 4 are shown identical with NPN output transistors 55 or 56, their collectors connected via the respective primary winding of signal transformers 63 or 64 to supply terminals 89 (+) or 90 (+). If these transistors are turned on the full wave rectified current will flow through the primary windings of the signal transformers. Stable operation requires the input NPN transistors 49 and 50 to be supplied through resistors 47 and 48 by smoothed DC. This is achieved by capacitors 51 and 52 which are charged and held to practically peak voltage of the full wave rectified supply by diodes 53 and 54, respectively. The emitters of the output transistors 55 or 56 are also referred to this smoothed voltage by resistors 57 or 58.

This smoothed DC voltage is also used to establish the bias of trigger input transistors 49 or 50 by means of the voltage dividing resistors 43 and 45 or 44 and 46, respectively. When a null-condition exists transistors 49 and 50 are fully turned on due to their bias and transistors 55 and 56 are turned off because their base voltages are thus made more negative than their emitter voltages as established by the voltage division of resistors 57, 59, 61 and 58, 60, 62.

To obtain a temperature-compensated bias for the transistors 41 and 42 in amplifier 2 the total voltage drop of serially connected diode-pairs 35 and 36, is divided by resistors 37, 38 and 39, 40. The current through the diodes is limited by resistors 33 and 34, respectively. The diodes are so chosen that the change of their forward voltage drop with temperature will compensate the change of transistor gain with temperature. Due to this bias the voltage at the junction between resistors 37 and 38 or 39 and 40 will be positive with respect to the emitters of transistors 41 or 42 and will thus add to the amplifier input, i.e., the output of comparison circuit 1 between terminal 20 and 21.

If the voltage representing the measurement of the controlled variable such as flow, temperature or other process variables, as the case may be, is larger than the setpoint voltage then the output voltage (control error) of comparison circuit 1 will be positive at terminal 20 and negative at terminal 21. Terminal 20 is connected to the base of the NPN transistor 41 and terminal 21 to the base of NPN transistor 42 in amplifier 2. Tracing the signal path from terminal 20, current will flow from base to emitter of NPN transistor 41 and through resistor 38 and, since this current cannot flow from emitter to base of transistor 42, its return path is completed via variable resistor 31 in feedback circuit 6 to terminal 21. Thus the bias voltage drop in resistor 38 is being added to the output voltage of comparison circuit 1. The resulting increase of base-emitter current of transistor 41 will cause a decrease of its collector-emitter resistance shunting resistor 45. This will pull the base voltage of transistor 49 in trigger circuit 3 closer to the negative supply potential thus causing its collector voltage, which is also the base voltage of transistor 55 to become more positive. This will permit a current to flow from terminal 89 (+) through primary winding of signal transformer 63 and via collector-emitter of transistor 55 through resistors 59 and 61 to terminal 87 (−). The resultant increased voltage drop at resistor 61 makes the emitter of transistor 49 more positive thus regeneratively further decreasing the current through transistor 49 and increasing the current through transistor 55. Thus, when the error voltage exceeds the threshold of the trigger circuit 3, transistor 49 will become nonconducting and transistor 55 fully turned on.

When transistor 55 is fully turned on its collector is nearly on the negative potential of terminal 87 (−) and, consequently, also line 108 which is connected to the collector of transistor 55. This switching of negative voltage on line 108 activates phase shift circuit 7 which is a circuit also known in the art as unijunction-transistor firing circuit. Connected to the emitter of unijunction transistor 69 is capacitor 75 which is charged via variable resistor 71 from supply terminal 89 (+) and via variable resistor 74 from the output voltage of position transducer 9. Diodes 72 and 73 decouple both charging sources. When the voltage of capacitor 75 becomes larger than the emitter voltage as established by resistor 68 then capacitor 75 will be discharged through primary winding of pulse transformer 70. This firing will occur at an instant within each half cycle of the AC mains which is determined by the time constants of the respective charging resistor and the voltage applied to it. The position transducer 9 must be arranged (inverse-action) to give increasing output voltage when the valve stem is moved in closing direction. Then firing pulses will occur earlier in each half wave.

The discharge of capacitor 75 through primary winding of pulse transformer 70 generates a firing pulse between terminals 96 and 97 of its secondary winding which are connected to identically numbered gate 97 and cathode 96 of silicon controlled rectifier (SCR) 95 in power unit 10. With SCR 95 conducting, current will flow from one or the other end of secondary winding of transformer 91 through one or the other diode of that diode pair of bridge rectifier 93 which is connected to the anode of SCR 95, through the armature of actuating motor 11 and return to center tap 92. Thus double wave rectified current with energy content of each half wave as determined by phase shift circuit 7 flows in one direction through motor 11 to power it in a forward sense of rotation.

Due to the friction between valve stem and stuffing box or other influences the thrust required to actuate the valve stem will never be reduced to zero. Therefore, even in fully open position, when the output voltage of position transducer 9 is zero, the firing pulses must not be retarded to phase positions near the end of each half wave. This minimum energy can be set by variable resistor 71 (phase shift circuit 7). Variable resistor 74 determines the maximum energy required. Since the required energy will differ in the case of single seat valves, when moving the stem against or in direction of the opposing force caused by pressure drop, resistor 74 and corresponding resistor 83 (phase shift circuit 8) will be adjusted differently.

Synchronization of the phase shift circuit 7 with the half wave energizing motor 11 is achieved because the double wave rectified voltage activating it, after output transistor 55 of trigger circuit 3 is switched on, is derived from output terminals 89 and 87 of bridge rectifier 105 fed from a secondary winding of transformer 100, whose primary winding is connected to the same AC mains as the primary of transformer 91 in power unit 10. This activation of phase-shift circuit 7 by switching on transistor 55 leads to an additional increased phase shift of the generated firing pulse which decreases the energy of the first pulse only which energizes motor 11. This reduction in energy is not constant, but varies in a statistical manner depending on the very instant within the relevant half wave at which transistor 55 switches on. In pulse trains consisting of more than one half wave the reduction of total energy content has decreasing influence on the resultant movement of the mechanical member with increasing number of half waves. In processes with long time constants, such as many temperature control loops, often the situation exists that the controller, in counteracting a small deviation, transmits single half wave pulses repeated with a very low frequency.

The lull periods between pulses may be many seconds or even minutes. This statistical reduction of the energy of the first pulse may cause an appreciable deterioration of control performance in such applications. The schematic of phase shift circuit 8 shows how this potential disadvantage is overcome by one additional NPN transistor 76 and resistor 101. The unijunction transistor 102 is connected to identical components as described for phase shift circuit 7 but it discharges capacitor 82 through resistor 101. Since the negative supply line 110 is directly connected to terminal 88 (−), phase shift circuit 8 is always actively generating firing pulses. The firing pulses, however, can only be transmitted to SCR 94 in power unit 10 when output transistor 56 of trigger circuit 4 is switched on. Only with transistor 56 conducting can the voltage developed across resistor 101, during the discharge of capacitor 82, cause a spike of current to pass via transistor 56, resistors 60 and 62 to negative line 110. For the duration of this current spike transistor 76 will be on, causing a pulse through the primary winding of pulse transformer 77 to its then negative collector. The resultant pulse between terminals 98 and 99 of its secondary winding is applied to identically numbered gate 99 and cathode 98 of SCR 94 rendering it conductive.

With SCR 94 conducting current will flow form center tap 92 of the secondary winding of transformer 91 through the armature of motor 11, through SCR 94 and one or the other diode of that diode pair of bridge rectifier 93 which is connected to the cathode of SCR 94 and return to one or the other end of the secondary winding. Thus double wave rectified current with energy content of each half wave as determined by phase shift circuit 8 flows in one direction through motor 11 to power it in a reverse sense of rotation.

This reverse sense of rotation of motor 11 is assigned to the case of the setpoint voltage becoming larger than the instantaneous transmitted measurement of the controlled process variable, i.e., output voltage of comparison circuit 1 positive at terminal 21 with respect to terminal 20. Tracing the signal path from terminal 21, current will flow from base to emitter of NPN transistor 42 and through resistor 40 and, since this current cannot flow from emitter to base of transistor 41, its return path is completed via variable resistor 30 in feedback circuit 5 to terminal 20. Thus the bias voltage drop in resistor 40 is being added to the output voltage of comparison circuit 1. The resulting increase of base-emitter current of transistor 42 will cause a decrease of its collector-emitter resistance shunting resistor 46. This affects trigger circuit 4 in exactly the same manner as described for trigger circuit 3.

When the output transistor 55 or 56 of trigger circuit 3 or 4 turns on, energizing the respective primary winding of signal transformer 63 or 64, the AC component of the full wave rectified primary current is induced in the secondary winding and passed to relevant feedback circuit 5 or 6. Diodes 66 and 67, shunting the primary windings of signal transformers 63 and 64, respectively, are to protect transistors 55 and 56 from inductive voltage transients. As long as the motor 11 is energized an AC feedback signal will be applied to the appropriate feedback circuit 5 or 6 where it will be converted to DC by bridge rectifier 24 or 25 charging capacitor 28 or 29 via variable resistor 26 or 27. As can be seen from the polarity of the capacitor voltage, i.e., its negative potential applied to the base of the respective NPN transistor 41 or 42, the corresponding trigger circuit will be turned off when the capacitor voltage exceeds the error voltage.

As long as trigger circuit 3 or 4 is on, capacitor 28 or 29 will be charged from the feedback signal which is equivalent in effect to a constant potential source. As is well known, the voltage rise of a capacitor charged by a constant source follows an exponential function characterized by its time constant, i.e., the product of its capacitance C and the resistance R through which it is charged. Thus with increasing error voltage the feedback circuit requires progressively increasing times to cancel the error voltage and, in consequence, to turn off its pertaining trigger circuit, thus stopping the motor 11. The trigger circuit 3 or 4 having been turned off, capacitor 28 or 29 will no longer be charged but discharged via variable resistor 30 or 31. Again this discharge will follow an exponential function on which is superimposed the effect of the error voltage which is of opposite polarity than the voltage of the corresponding feedback capacitor 28 or 29. This leads to a progressive decrease of the lull periods between pulse trains, the respective trigger circuit 4 or 5 turning on again when the voltage of the corresponding feedback capacitor has decayed below the instantaneous error voltage. This effect of pulse duration B, i.e., number of pulses in the train progressively increasing and the lull periods between trains progressively decreasing with increasing error voltage, can be seen by comparing lines 2a, 3a and 4a in FIG. 4. From this the special aspect of pulse ratio modulation results, i.e., with increasing control error C pulse frequency A (the frequency with which the pulse trains are repeated) increases to a maximum and then decreases again as shown in FIG. 1.

It should be understood that by suitable arrangement of passive and/or active components in the feedback circuits different types of pulse modulations can be achieved and employed within the teachings of the invention.

As has been described, a control system according to the invention permits to energize a fast acting DC disc armature motor coupled directly to the stem of a process control valve or other mechanical member with trains of half waves obtained by rectification from the AC mains, the energy content of each half wave being determined in proportion to the force required to move the mechanical member, the number of half wave pulses in the pulse trains and the frequency with which these pulse trains are repeated being determined by a pulse modulation. Therefore, even in the presence of large and varying forces the actuating motor will convert each half wave pulse to an incremental step of constant width thus providing a reproducible and superior control performance.

Supply transformer 100 is shown to have 4 secondary windings with full wave rectifier 105 supplying trigger circuit 3; full wave rectifier 106 supplying trigger circuit 4 and phase shift circuit 8; full wave rectifier 107 supplying position transducer 9, after filtering with capacitor 111, with a stabilized voltage from zener diode 115, zener current being limited by resistor 113; full wave rectifier 117 supplying setpoint potentiometer 18, after filtering with capacitor 112, with a stabilized voltage from zener diode 116, zener current being limited by resistor 114.

It is to be understood that the particular embodiment which has been described in detail is not to be taken in a limiting sense, but is only illustrative of one means of implementing the present invention. Accordingly, various modifications and changes may be made in the invention without departing from the scope and spirit thereof as defined by the appended claims.

The invention is hereby claimed as follows:

1. A method for the stepwise movement of a mechanical member by an electric motor which comprises energizing said motor for clockwise or counterclockwise step movement with a series of trains of individual pulses, controlling the number of said individual pulses in said trains and the pause between said trains by pulse modulation, and controlling the energy content of each of said individual pulses in said trains in dependence upon the instantaneous force required to move said mechanical member.

2. A method as claimed in claim 1, wherein the energy content of said individual pulses is controlled by the output of a force-measuring instrument coupled to the mechanical member to be moved.

3. Apparatus for the stepwise movement of a mechanical member by an electric motor which comprises means for energizing said motor for clockwise or counterclockwise step movement with a series of trains of individual pulses, means for controlling the number of said individual pulses in said trains and the pause between said trains by pulse modulation, and means for controlling the energy content of each of said individual pulses in said trains in dependence upon the instantaneous force required to move said mechanical member.

4. Apparatus for the stepwise movement of a mechanical member which comprises a DC disc armature motor directly coupled to said mechanical member, a power unit energizing said motor for clockwise and counterclockwise step movement with a series of trains of individual pulses obtained by controlled rectification from the AC mains, a phase shift circuit for each direction of rotation of said disc armature, said phase shift circuit triggering the corresponding controlled rectifier of said power unit, a force measuring means to control said phase shift circuit in dependence upon the instantaneous force requirement of said mechanical member, a trigger circuit for each of said phase shift circuits, and an amplifier which amplifies the deviation or error of a process control means in interaction with a feedback circuit from each of said trigger circuits to control the number of said individual pulses in said trains and the pause between said trains by pulse modulation.

5. Apparatus as claimed in claim 4 in which said mechanical member is the stem of a process control valve having a single seat.

6. Apparatus for the stepwise movement of a stem of a process control valve having a single seat which comprises a DC disc armature motor directly coupled to said stem, a power unit energizing said motor for clockwise and counterclockwise step movement with a series of trains of individual pulses obtained by controlled rectification from the AC mains, a phase shift circuit for each direction of rotation of said disc armature, said phase shift circuit triggering a corresponding controlled rectifier of said power unit, a position indicator coupled to said stem, means coacting with said indicator to control said phase shift circuit in dependence upon the instantaneous position of said stem, a trigger circuit for each of said phase shift circuits, and an amplifier which amplifies the deviation or error of a process control means in interaction with a feedback circuit from each of said trigger circuits to control by pulse modulation the number of said individual pulses in said trains and the pause between said trains in dependence upon the instantaneous position of said stem.